US009413579B2

(12) United States Patent
Nilsson et al.

(10) Patent No.: US 9,413,579 B2
(45) Date of Patent: Aug. 9, 2016

(54) DETERMINING FREQUENCY ERRORS IN A MULTI-CARRIER RECEIVER

(75) Inventors: Thomas Nilsson, Malmö (SE); Jianjun Chen, Lund (SE); Amit Singh, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 190 days.

(21) Appl. No.: 14/110,875

(22) PCT Filed: Mar. 14, 2012

(86) PCT No.: PCT/EP2012/054486
§ 371 (c)(1),
(2), (4) Date: Dec. 10, 2013

(87) PCT Pub. No.: WO2012/139849
PCT Pub. Date: Oct. 18, 2012

(65) Prior Publication Data
US 2015/0358192 A1    Dec. 10, 2015

Related U.S. Application Data

(60) Provisional application No. 61/475,786, filed on Apr. 15, 2011.

(30) Foreign Application Priority Data

Apr. 13, 2011 (EP) ..................................... 11162209

(51) Int. Cl.
*H04B 1/10* (2006.01)
*H04L 27/26* (2006.01)
(Continued)

(52) U.S. Cl.
CPC .......... *H04L 27/2657* (2013.01); *H04B 1/1081* (2013.01); *H04L 25/0222* (2013.01);
(Continued)

(58) Field of Classification Search
CPC ..... H04B 1/7115; H04B 7/0817; H04B 7/084
USPC .................................. 375/347, 349; 370/342
See application file for complete search history.

(56) References Cited

U.S. PATENT DOCUMENTS

| 6,608,858 | B1 | 8/2003 | Sih et al. |
| 7,257,176 | B2 | 8/2007 | Sommer et al. |
| 7,443,826 | B1 * | 10/2008 | Atarius ............... H04B 1/7087 370/342 |

(Continued)

FOREIGN PATENT DOCUMENTS

| WO | 0159937 A2 | 8/2001 |
| WO | 2008099410 A2 | 8/2008 |
| WO | 2010123783 A1 | 10/2010 |

*Primary Examiner* — Daniel Washburn
*Assistant Examiner* — Fitwi Hailegiorgis
(74) *Attorney, Agent, or Firm* — Murphy, Bilak & Homiller, PLLC

(57) ABSTRACT

Individual multipath components of digital data symbols sent from a transmitter on at least two carrier frequencies generated from a common clock signal, are received (401) with individual delays and processed by a receiver unit having at least two fingers. Successive channel estimates are determined (402) from received symbols for each finger and each carrier, and an estimated frequency error is determined (404) for each finger and each carrier. A linear equation system is constructed (405), in which each determined frequency error is expressed as a function of a first variable indicative of frequency drift and a second variable indicative of frequency error caused by Doppler effect. The equation system is solved (406) to provide a solution with estimates of the first and second variables for each finger, and an estimated frequency drift is determined (407) from the solution and utilized (408) as feedback signal for adjusting receiver clock frequency.

15 Claims, 5 Drawing Sheets

(51) Int. Cl.
*H04L 25/02* (2006.01)
*H04L 27/00* (2006.01)

(52) U.S. Cl.
CPC ........ *H04L27/0014* (2013.01); *H04L 27/2672* (2013.01); *H04L 27/2675* (2013.01); *H04L 27/2695* (2013.01)

(56) References Cited

U.S. PATENT DOCUMENTS

2009/0279476 A1 11/2009 Li et al.
2010/0290356 A1 11/2010 Hadad et al.

* cited by examiner

DETERMINING FREQUENCY ERRORS IN A MULTI-CARRIER RECEIVER

TECHNICAL FIELD

The invention relates to determining frequency drift and frequency errors caused by Doppler effect in a multi-carrier receiver using at least two fingers.

BACKGROUND

In any Universal Mobile Telecommunications System (UMTS) system frequency errors are introduced by clock mismatch between the user equipment and the base station and in the channel from Doppler effect. The user equipment tries to compensate for these errors by using Automatic Frequency Correction (AFC), which contains two main parts, i.e. frequency error estimation and error correction. In its simplest form, frequency error estimation can be performed by comparing received Common Pilot Channel (CPICH) pilots in the receiver with the sent ones. A frequency error will show up as a rotation of the recovered pilot symbols in the IQ plane over time.

The frequency error is normally composed of two parts; i.e. the frequency error due to the clock mismatches between the user equipment and the base station, which is also called frequency drift, and the random component due to Doppler effect. The first is slowly varying mainly because of temperature changes in the user equipment and the latter is a result of several impinging waves received at the user equipment. The angle of arrival and the speed which the user equipment travels determine the frequency shift for each wave.

In order to correct for frequency errors it is desired that both components be known independently. In single carrier systems there is no easy way to distinguish between these two sources of frequency error. The Doppler frequency can be estimated using multiple techniques none of which are very accurate or fast. Some of the well known estimation techniques include (but are not limited to), Level Crossing Rate (LCR), Zero Crossing Rate (ZCR) and Covariance-based estimators that exploit autocovariances of powers of the signal envelope.

The existing solutions use time domain characteristics like level crossing rate, which requires an appreciable measurement time and thus cannot react to fast Doppler changes. The Doppler frequency estimated is inherently noisy and thus needs to be used with some kind of filtering or hysteresis. This causes problems when there are frequent speed changes and the Doppler frequency estimation never converges. The current algorithms do not exploit the diversity in dual Cell High-Speed Downlink Packet Access (HSDPA) scenarios.

The Doppler component is adding noise to the frequency estimation. This leads to decreased accuracy in the frequency error estimation and requires strong filtering. Current Doppler frequency estimation techniques are very inaccurate and require a large number of samples and filtering to converge. In wideband systems where it is possible to resolve independent paths the present solutions cannot be used to estimate and compensate for the Doppler effect per path, i.e. per finger.

Multi-carrier operation involves jointly scheduling two or more HS carriers to increase the peak data rates per user and increase the utilization of available frequency resources by multiplexing carriers in CELL DCH state. Dual-carrier HSDPA is included in Release 8 of 3GPP, other variations such as Dual Band HSDPA, DC-HSDPA etc are included in Release 9. Release 10 includes 4 HS carriers and Release 11 is expected to include 8 HS carriers in two different bands.

In Dual-Carrier (or Multi-Carrier) HSDPA there are two types of carriers. The first carrier known as the 'Anchor carrier' carries all the legacy physical channels including DPCH/ F-DPCH, E-HICH, E-RGCH, E-AGCH, PICH, SCCPCH, AICH etc. The other carriers are 'supplementary' carriers and carry a reduced set of physical channels in order to reduce signaling overhead.

A method of frequency tracking and compensation for frequency error due to Doppler effect in a plurality of multipath signals is shown in U.S. Pat. No. 6,608,858. The Doppler compensation is based on only one carrier. Each finger of a RAKE receiver computes a frequency error for that finger, and a weighted average of all these frequency errors is calculated and filtered to provide a control signal for the internal frequency synthesizers. This method will not be able to separate the Doppler component and the drift component completely, since after averaging over fingers the error will still contain some sort of weighted average Doppler component, due to the limitation of using only one carrier.

SUMMARY

Therefore, it is an object of embodiments of the invention to provide a method in a Dual-Carrier or Multi-Carrier system that is able to separate the frequency drift caused by clock mismatch between the user equipment and the base station and the frequency error caused by the Doppler effect, and thus improves frequency error and Doppler effect estimation.

According to embodiments of the invention the object is achieved in a method of receiving digital data symbols sent from a transmitter on at least two carrier frequencies generated from a common clock signal, wherein individual multipath components of a transmitted data symbol are received with individual delays, and wherein received signals are processed by a receiver unit having at least two fingers, the method comprising the steps of determining from successively received symbols successive channel estimates for each finger and each carrier; calculating for each finger and each carrier from a set of successive channel estimates a change in channel estimate; and determining from said change in channel estimate an estimated frequency error for each finger and each carrier. The object is achieved when the method further comprises the steps of constructing a linear equation system in which each determined frequency error is expressed as a function of a first variable indicative of a frequency drift caused by a clock mismatch between the receiver and the transmitter and a second variable indicative of a frequency error caused by a Doppler effect due to movement of the receiver relative to the transmitter; solving said equation system to provide a solution with estimates of said first and second variables for each finger; determining from said solution an estimate of the frequency drift; and utilizing said estimate of the frequency drift as a feedback signal for adjusting the receiver clock frequency.

In a multicarrier communication system frequency error estimation can be performed per carrier. The carrier diversity can be used to improve the Doppler shift estimation. Basically, the calculated frequency error estimates contain the same drift component and the same number of random Doppler shift components. This assumes that the fingers are placed at the same time offsets for all the carriers. The receiver unit having at least two fingers may be e.g. a RAKE receiver, a GRAKE receiver or an FFT based receiver.

By constructing a simple linear system of equations, a number, which depends on the number of carriers available, of the unknown Doppler shift components and the frequency drift can be derived, and a better feedback signal for the receiver clock frequency is achieved. This solution requires the base station to use the same frequency source for the carrier generation, i.e. the frequency drift will be the same for all carriers. Most network manufacturers prefer to use as few frequency sources as possible to save on manufacturing and component costs, so therefore this requirement will often be fulfilled.

In one embodiment, the step of solving the equation system comprises using Gaussian elimination. Further, the step of solving the equation system may comprise solving a linear least square problem, which is an expedient solution when there are more than two carriers.

In one embodiment, the first variable may be a frequency drift for that finger, and in that case, the method may further comprise the step of determining the estimate of the frequency drift by averaging the first variable over all fingers.

In one embodiment, the second variable is a velocity of the receiver relative to the transmitter for that finger. This has the benefit that these velocities are the same for all carriers, while the frequency error caused by the Doppler effect depends on the carrier frequency.

The method may further comprise the steps of determining from said solution an estimate of the frequency error caused by the Doppler effect for each finger and each carrier; and utilizing said estimate of the frequency error caused by the Doppler effect for each finger and each carrier for compensating signals received for each finger and each carrier for the frequency error caused by said Doppler effect. This compensation will improve equalizer performance and thus lead to a higher throughput.

Some embodiments of the invention also relate to a receiver for digital data symbols sent from a transmitter on at least two carrier frequencies generated from a common clock signal, wherein individual multipath components of a transmitted data symbol are received with individual delays, and wherein received signals are processed by a receiver unit having at least two fingers, the receiver being configured to determine from successively received symbols successive channel estimates for each finger and each carrier; calculate for each finger and each carrier from a set of successive channel estimates a change in channel estimate; and determine from said change in channel estimate an estimated frequency error for each finger and each carrier. The receiver is further configured to construct a linear equation system in which each determined frequency error is expressed as a function of a first variable indicative of a frequency drift caused by a clock mismatch between the receiver and the transmitter and a second variable indicative of a frequency error caused by a Doppler effect due to movement of the receiver relative to the transmitter; solve said equation system to provide a solution with estimates of said first and second variables for each finger; determine from said solution an estimate of the frequency drift; and utilize said estimate of the frequency drift as a feedback signal for adjusting the receiver clock frequency.

Embodiments corresponding to those mentioned above for the method also apply for the receiver.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION OF EMBODIMENTS

Figure 1:
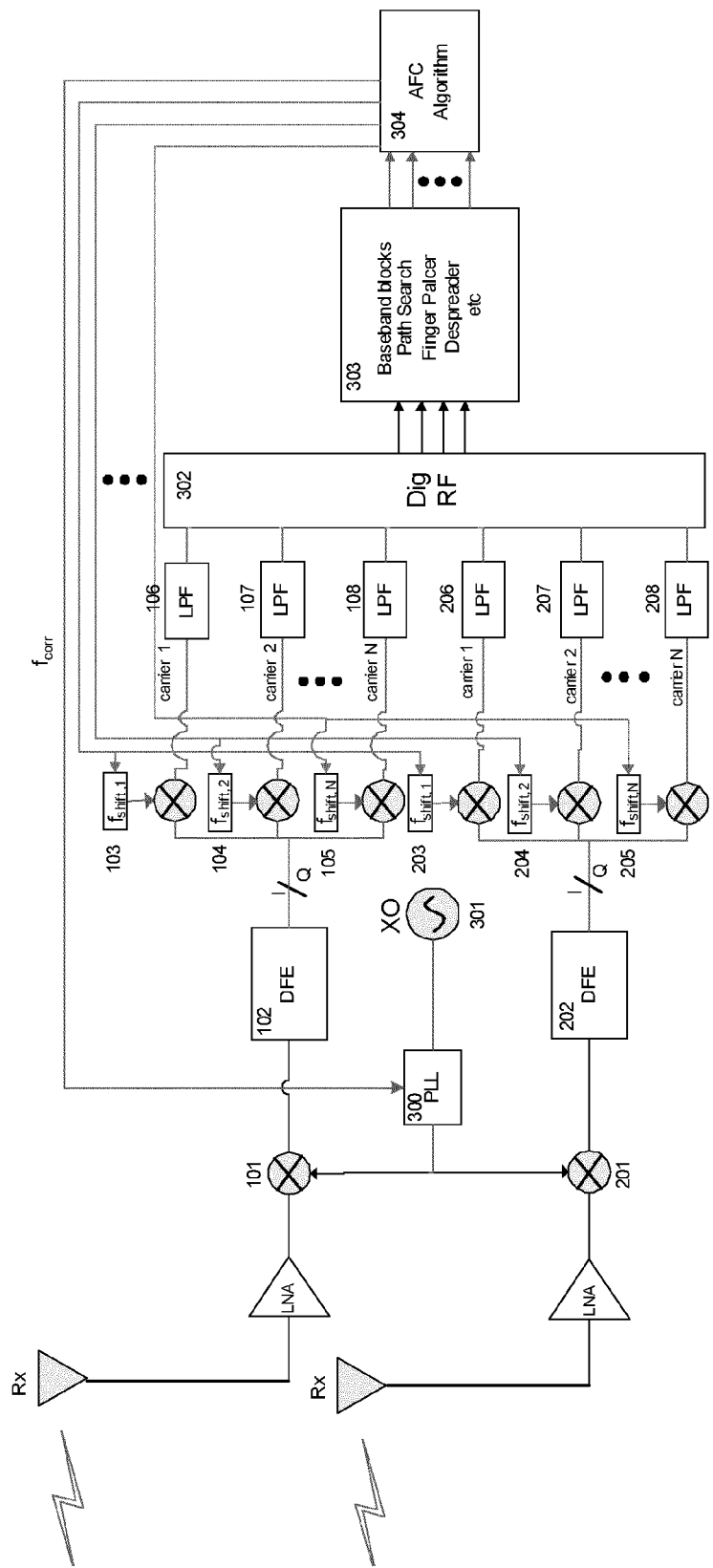
FIG. 1 shows an example of a multi-carrier receiver with a single local oscillator.

FIG. 1 shows an example of a baseline multi-carrier receiver using one and only one local oscillator. The shown receiver uses two antennas and two receiver paths, but it is noted that the invention described below works just as well in receivers with only one receiver path or with more than two receiver paths. The receiver uses a number of fingers, such as it is known from e.g. RAKE receivers.

In the figure, N carriers are received with two antennas, down-converted to baseband frequency using mixers 101, 201 and a phase locked loop 300 in combination with an oscillator 301, so that DC falls precisely in the middle of the N received carriers. The two received signals are then passed through a digital front end (DFE) 102, 202 which involves analog to digital conversion, filtering and automatic gain control operations. The carriers are separated after the DFE.

The carriers are then down converted to zero frequency by using blocks 103,104,105,203,204 and 205. Once the carrier of interest has been down-converted to zero frequency, the adjacent unwanted carrier is removed using a subsequent low-pass filter 106, 107, 108, 206, 207 and 208. The output is then passed to the baseband processor block 303 through the Dig RF interface 302. The baseband processing block 303 contains functions such as path searcher, finger placer and despreaders, as it will be described below in the case of a RAKE receiver. Instead of the RAKE receiver, e.g. a GRAKE receiver or an FFT based receiver can be used as well.

Once per slot, the baseband processing block 303 outputs received and de-spread Common Pilot Channel (CPICH) pilot symbols $g_i^{c,a,f}$, where i denotes the pilot symbol number in the received slot, c denotes carrier number, a denotes receiver antenna number and f denotes the finger number. The pilot symbols are fed into an Automatic Frequency Control (AFC) Algorithm block 304.

The AFC block 304 analyses one slot of received pilot symbols and produces a control command to adjust the PLL in block 300 and reduce the frequency error between the transmitted and received frequencies. As mentioned below, such frequency error may occur due to clock mismatch between the base station and the user equipment and/or a random component due to Doppler effect.

Below, the concept of using fingers in a RAKE receiver to compensate for multipath delays is described with reference to FIGS. 2 to 5.

Figure 2:
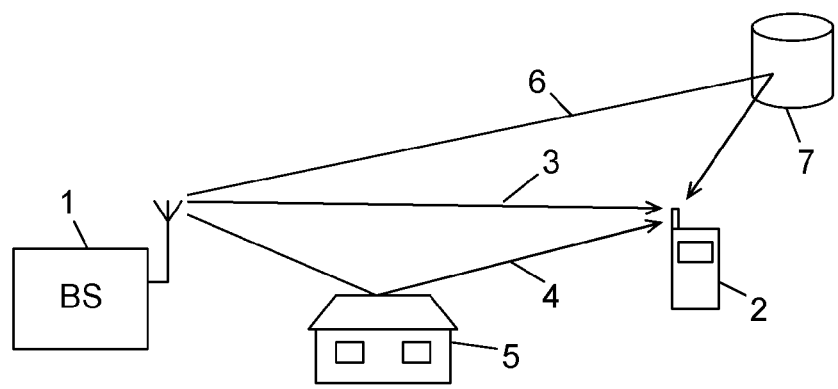
FIG. 2 shows an example of multiple paths between a base station and a mobile station.

FIG. 2 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different delays. It is noted that in the case where signals are transmitted on more than one carrier between the base station 1 and the mobile station 2, all carriers will have the same propagation paths.

Figure 3:
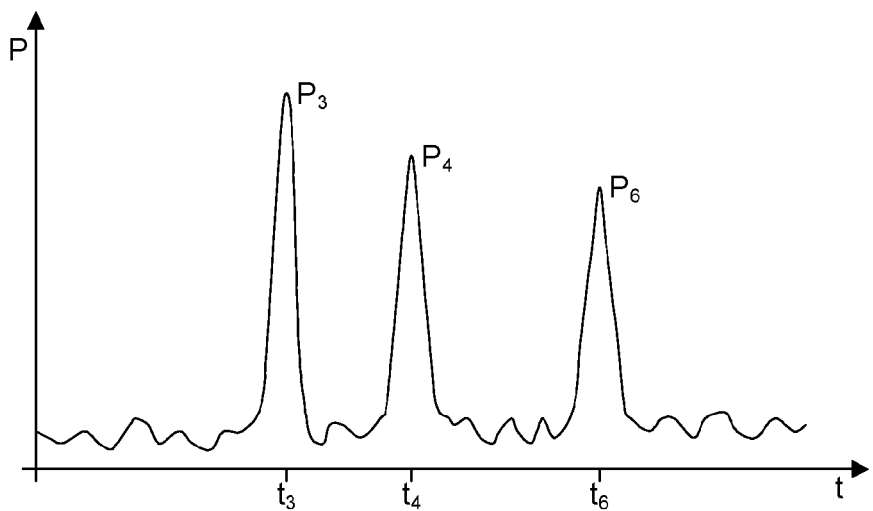
FIG. 3 shows a power delay profile for the paths illustrated in FIG. 2.

Thus, if a pilot signal is transmitted from the base station 1, the power P received at the mobile station 2 as a function of the time t may look as illustrated in FIG. 3, which shows an example of a power delay profile. The power delay profile shows all signals received at the mobile station, including noise and interference signals. However, only the peaks in the power delay profile correspond to the multipath components of the transmitted signal. Together these peaks form the impulse response of the channel. In FIG. 3 the peak $P_3$ received at the time $t_3$ corresponds to the direct path 3 in FIG. 2, while the peaks $P_4$ and $P_6$ received at the times $t_4$ and $t_6$, respectively, correspond to the indirect paths 4 and 6 in FIG. 2. Thus, as an example, it is seen that the delay of the path 6 (corresponding to the peak $P_6$) is larger than the delay of the path 3 (corresponding to the peak $P_3$).

Figure 4:
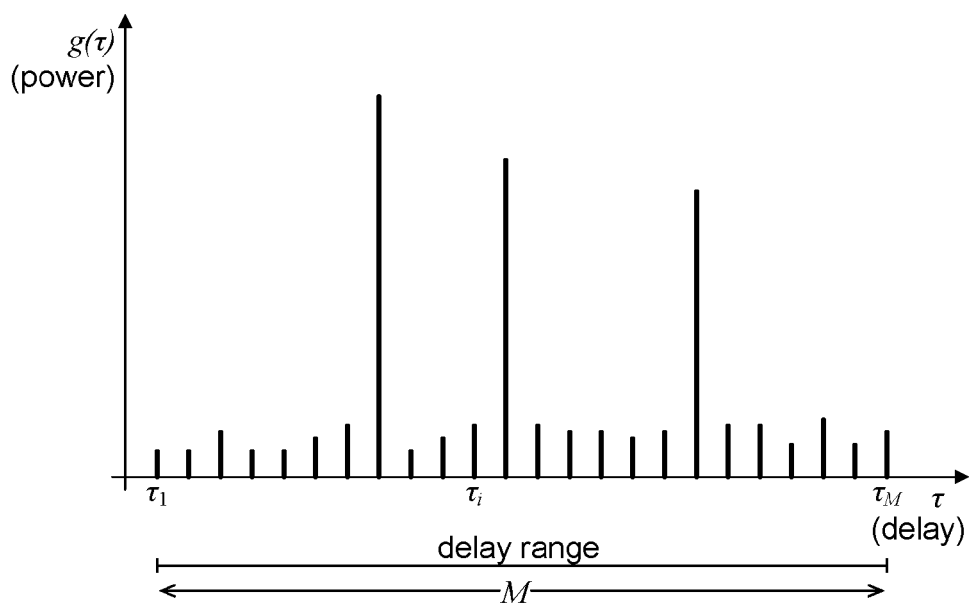
FIG. 4 shows a sampled delay profile corresponding to the profile shown in FIG. 3.

Typically, the delay profile of the received signal will not be available as a continuous curve as the one illustrated in FIG. 3. Instead, it will consist of a number of sample values. This is illustrated in FIG. 4, which shows a sampled power delay profile corresponding to the continuous delay profile shown in FIG. 3. For each delay value $\tau_i$ (where $i \in [1,M]$, i.e. the full possible delay range), the corresponding power value $g(\tau_i)$ is shown. In this case the available estimates of the power delay profile constitutes a contiguous sequence of equally spaced samples, $\tau_i = \tau_0 + i\Delta\tau$.

The mobile station 2 and the base station 1 may be adapted for use in e.g. a Code Division Multiple Access (CDMA) system or a Wideband Code Division Multiple Access (WCDMA) system, and in that case the mobile station 2 may use a RAKE receiver, which is capable of identifying and tracking the various multipath signals for a given channel. In this way the energy or power of several multipath components can be utilized in the receiver. In the RAKE receiver each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate. Thus the RAKE receiver requires knowledge of the multipath delays and the values of the channel impulse response for all paths. The signal energy from as many physical paths as possible should be collected. This knowledge can be obtained from the delay profiles.

Figure 5:
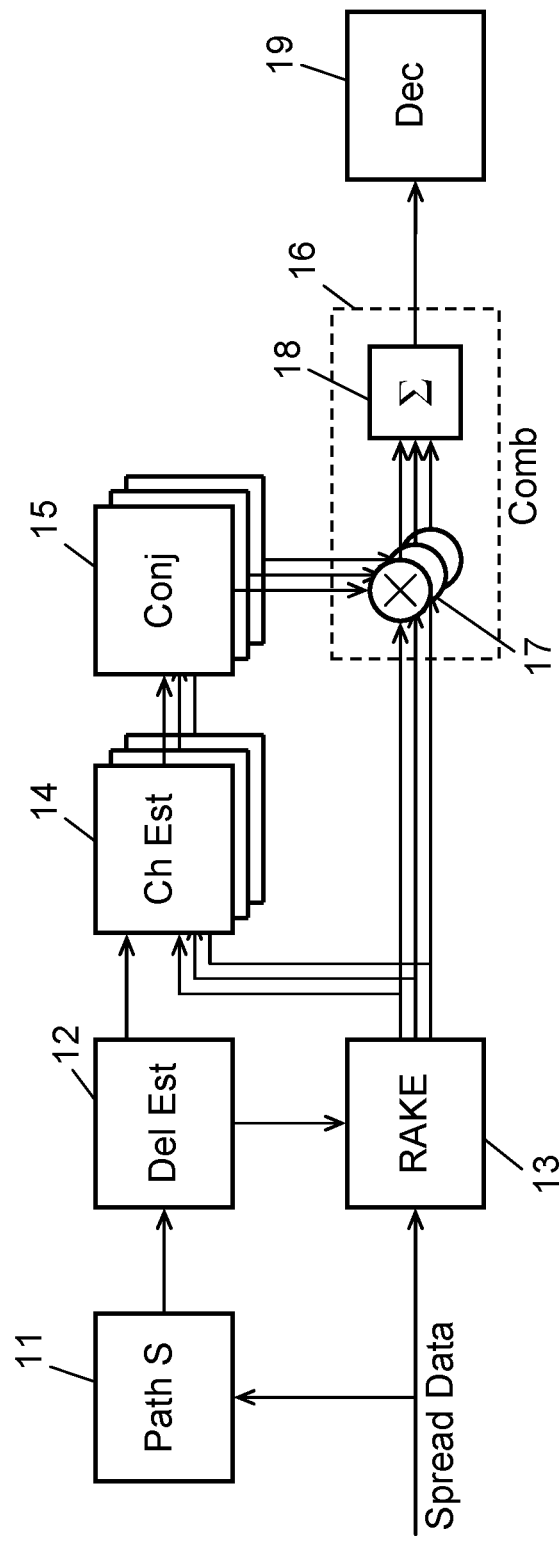
FIG. 5 shows an overview of a RAKE receiver.

Since the structure of the propagation channel does not remain constant over time, the delays of existing paths change, old paths disappear and new paths appear. The changing delays of all known multipath components should be tracked, and new paths should be discovered quickly after they appear. Therefore, infrequently activated limited-range path searchers are typically used for detecting new paths and, in some implementations, for re-detecting temporarily faded existing paths. This is illustrated in FIG. 5, which shows an overview of a RAKE receiver.

In the receiver, the received spread data signals are supplied to the path searcher 11 and the RAKE unit 13. The path searcher 11 is a device that periodically computes instantaneous impulse response estimates (complex or power) over a range of delays that is also called a path search window. Since the path searcher 11 is mainly used only to detect the existence of paths, its output resolution may be lower than that required by the RAKE unit 13. Thus a general delay estimation algorithm is used in the delay estimator 12, which is able to extract the path positions and find their delays with sufficient accuracy, once they are discovered by the path searcher 11, so that the best ones are selected for despreading in the RAKE unit 13. The detected path delays, i.e. the delays representing peaks in the delay profile, are then delivered to the RAKE unit 13 and a channel estimator 14.

The received signals are then despread in the RAKE unit 13, in which each reported delay is assigned a RAKE finger, and each RAKE finger presents a complex despread data symbol. In FIG. 5 three fingers are shown as an example. In the channel estimator 14 a channel estimate for each path (finger) is calculated from the despread data symbols provided by the RAKE unit 13 and the detected delays provided by the delay estimator 12. The complex conjugate of each channel estimate (i.e. for each finger) is then calculated in the conjugate function 15. In the combiner 16 the despread data symbols provided by the RAKE unit 13 are multiplied in the multiplying units 17 by the conjugated channel estimates provided by the conjugating unit 15 and summed over all fingers in the summing unit 18. The results are then used for further decoding in the decoder 19.

As mentioned above, received and de-spread Common Pilot Channel (CPICH) pilot symbols $g_i^{c,a,f}$ are fed from the baseband processing block 303 (e.g. the RAKE receiver of FIG. 5) to the AFC block 304, which analyses one slot of received pilot symbols and produces a control command to adjust the PLL in block 300 and reduce the frequency error between the transmitted and received frequencies.

Automatic Frequency Correction (AFC) contains two main parts, frequency error estimation and error correction. In its simplest form, frequency error estimation can be performed by comparing the received CPICH pilots in the receiver with the sent ones. A frequency error will show up as a rotation of the recovered pilot symbols in the IQ plane over time.

The phase distortion of the signal, due to the frequency drift, propagation channel etc, can be measured as a channel estimate by using the pilot symbols as follows $$\hat{y} = \vec{s}_{curr} * (\vec{s}_{prev})^*,$$

where $\vec{s}_{curr}$ and $\vec{s}_{prev}$ are the current and previous pilot symbol and $(\vec{s}_{prev})^*$ is the complex conjugate of $\vec{s}_{prev}$.

The frequency error, $\Delta f$, can then be determined via the phase of the channel estimate by the following relation, $$2\pi \Delta f T_0 = \arctan\left(\frac{\text{Im}(\hat{y})}{\text{Re}(\hat{y})}\right),$$

where $T_0$ is the sampling period.

The per-slot analysis and generation of frequency correction control command may be performed as follows:

1. Channel estimates, $h_i^{c,a,f}$ where c denotes carrier number, a denotes Rx antenna, f denotes the finger number and i denotes the received pilot symbol number in the slot being processed, are produced according to $$h_i^{c,a,f} = g_i^{c,a,f}(p_i^c)^* \qquad (1)$$

where $p_i^c$ denotes the transmitted (known) pilots and * denotes complex conjugate. Although not explicitly stated in the standard, WCDMA receivers usually employ despreaders at different time delays, so called fingers. The number of employed fingers is usually adjusted to match the propagation channel. It is noted that instead of computing the channel estimates from the received pilot symbols, they may also be computed from correctly decoded data symbols, i.e. non-pilot symbols.

2. For i=0, 1, . . . , 9 do $$\Delta h_i^{c,a,f} = h_{i+1}^{c,a,f} \cdot (h_i^{c,a,f})^*. \quad (2)$$

Here, $h_0^{c,a,f}$ is the last channel estimate from the previous slot.

3. Filter the values attained in the previous step be e.g. taking the mean as, $$y_{c,f} = \Sigma_{a=1}^{A} \Sigma_{i=0}^{9} \Delta h_i^{c,a,f}, \quad (3)$$

where A denotes the number of employed antennas. Further, $y_c$ may be filtered over the number of fingers if desired.

4. Then compute angle, $$\varphi_{c,f} = \frac{1}{2\pi} \arctan \frac{\text{Im}(y_{c,f})}{\text{Re}(y_{c,f})}. \quad (4)$$

5. The frequency error estimate ($f_{est,f}^c$) can be computed as, $$2\pi \varphi_{c,f} = 2\pi \cdot \Delta t \cdot f_{est,f}^c \Rightarrow f_{est,f}^c = \frac{1}{\Delta t} \cdot \varphi_{c,f} \text{Hz}, \quad (5)$$

where $\Delta t$ is the time between two CPICH symbols, which is $$\Delta t = \frac{10^{-3}}{15 * 10} = \frac{\text{frame\_duration}}{\text{slots\_per\_frame} * \text{pilot\_symbols\_per\_frame}} \quad (6)$$

Thus $f_{est,f}^c = 1500 \cdot \varphi_{c,f} \text{Hz}$

This frequency error estimate can then be used as a feedback signal or control command to the PLL in block 300, or for generating such a feedback signal.

However, the frequency error, and thus also the estimate calculated above, is normally composed of two parts; i.e. the frequency error or frequency drift due to clock mismatches between the user equipment and the base station and the random component due to Doppler effect. The first is slowly varying, mainly because of temperature changes in the user equipment, and the latter is a result of several impinging waves received at the user equipment. The angle of arrival and the speed which the user equipment travels determine the frequency shift for each wave.

In order to better correct for frequency errors it is desired that these two components be known independently.

Existing solutions for detecting Doppler frequency use time domain characteristics like level crossing rate which requires an appreciable measurement time and thus cannot react to fast Doppler changes. The Doppler frequency estimated is inherently noisy and thus needs to be used with some kind of filtering or hysteresis. This causes problems when there are frequent speed changes and the Doppler frequency estimation never converges. The current algorithms do not exploit the diversity in dual Cell HSDPA scenarios.

The Doppler component is adding noise to the frequency estimation. This leads to decreased accuracy in the frequency error estimation and requires strong filtering. Current Doppler frequency estimation techniques are very inaccurate and require a large number of samples and filtering to converge. In wideband systems where it is possible to resolve independent paths the present solutions cannot be used to estimate and compensate for the Doppler effect per path (finger).

With the approach described below, it will be possible to separate the frequency error caused by the clock mismatch between the user equipment and the base station and the frequency error caused by the Doppler effect. The result is improved frequency error and Doppler shift estimation.

In a multicarrier communication system frequency error estimation can be performed per carrier. A multicarrier communication system is here considered as a system where digital data symbols are sent from a transmitter on at least two carrier frequencies, i.e. the two carrier frequencies are transmitted from the same physical location. The carrier diversity can be used to improve the Doppler shift estimation. Basically, all the frequency error estimates, i.e. the estimates calculated above, contain the same drift component and the same number of random Doppler shift components. This assumes that the fingers are placed at the same time offsets for all the carriers.

By constructing a simple linear system of equations, a number, which depends on the number of carriers available, of the unknown Doppler shift components can be derived. This solution requires the base station to use the same frequency source for the carrier generation, i.e. the frequency drift will be the same for all carriers. Most network manufacturers prefer to use as few frequency sources as possible to save on manufacturing and component costs, so therefore this requirement will often be fulfilled.

It is assumed that the bandwidth of the system is large enough to resolve the paths to an extent that paths having the same or very similar Doppler effect are collected by each finger.

The estimated frequency error per finger $f_{est}$, i.e. the frequency error estimated above, consists of two parts $$f_{est} = f_{drift} + f_{doppler}, \quad (1)$$

where $f_{drift}$ is the frequency error due to the clock mismatch and $f_{doppler}$ is the frequency error caused by one or several waves with very similar Doppler shifts. Assume that the fingers are placed at the same time offsets for each carrier and that there are N carriers and M fingers.

Then $$f_{est,k}^1 = f_{drift,k} + f_{doppler,k}^1 \quad (2)$$
$$f_{est,k}^2 = f_{drift,k} + f_{doppler,k}^2,$$
$$\vdots$$
$$f_{est,k}^N = f_{drift,k} + f_{doppler,k}^N,$$

where k=1, 2, . . . , M denotes the fingers. It is noted that $f_{drift}$ is i the same for all carriers, while it may vary between the fingers. Therefore, the term $f_{drift,k}$ is used.

It is generally known that the classical observed Doppler shift (f) and the corresponding frequency change ($\Delta f$) can be derived by $$f = \left(1 - \frac{v}{v_c}\right)f_0, \quad (3)$$

$$\Delta f = -\frac{v}{v_c}f_0 = -\frac{v}{\lambda}, \quad (4)$$

where v is the velocity of the source relative to that of the receiver, $f_0$ is the transmitter carrier frequency, $\lambda$ is the wavelength of the transmitted wave and $v_c$ is the speed of the electromagnetic wave in vacuum.

By inserting equation 4 into equation 2 we get $$f_{est,k}^c = f_{drift,k} - \frac{v_k}{\lambda_0 + \Delta\lambda_c}, \quad k = 1, 2, \ldots, M \text{ and} \quad (5)$$

$$c = 1, 2, \ldots, N.$$

The carrier wavelength is denoted by $\lambda_0$ and $\Delta\lambda_c$ is the offset to the wavelength $\lambda_0$ for carrier c.

The unknown Doppler component can be estimated when N>1, by constructing a linear equation system. The linear system of equations can be expressed in the form $$A_k x_k = b_k, \quad (6)$$

where $x_k = [f_{drift,k} v_k]^T$, $b_k = [f_{est,k}^1, f_{est,k}^2, \ldots, f_{est,k}^N]^T$ and $$A_k = \begin{bmatrix} 1 & -\frac{1}{\lambda_0 + \Delta\lambda_1} \\ 1 & -\frac{1}{\lambda_0 + \Delta\lambda_2} \\ \vdots & \vdots \\ 1 & -\frac{1}{\lambda_0 + \Delta\lambda_N} \end{bmatrix}$$

and T is the transpose operation.

In other words, $b_k$ is a vector with the frequency error estimates that were measured above and thus considered to be known, $x_k$ is a vector with the variables that we want to determine, and $A_k$ is a matrix with the model describing the relationship between them.

The inverse of A, i.e $A^{-1}$ can be computed by e.g. Gaussian elimination. If there are more than two carriers, i.e. N>2, then the system is over determined and an approximate solution can be found by solving a linear least square problem $$\min_{x_k} \|A_k x_k - b_k\|, \quad (7)$$

with the following solution, $$x_k = (A_k^T A_k)^{-1} A_k^T b_k. \quad (8)$$

Equation 8 can be solved by e.g. Gaussian elimination. As mentioned above, if there are more than two carriers, an approximate solution can be found by solving a linear least square problem. However, when there are only two carriers, a least square method is not needed to solve for the drift and Doppler shift components. It will be sufficient to solve equation 6 with normal Gaussian elimination. In other words, in this case there are two unknown variables and two equations, and thus an exact solution can be found without the need for a least square method.

The solution $x_k$ thus provides the wanted values of $f_{drift,k}$ and $v_k$.

An improved frequency drift estimate can be computed by averaging over the fingers as follows $$f_{drift} = \frac{1}{M} \sum_{k=1}^{M} f_{drift,k} \quad (9)$$

The estimate $f_{drift}$ calculated in this way can then be used as a feedback signal for the PLL in block 300 instead of previously estimated $f_{est}$, which leads to a better compensation because the effect of the Doppler is now cancelled.

Figure 6:
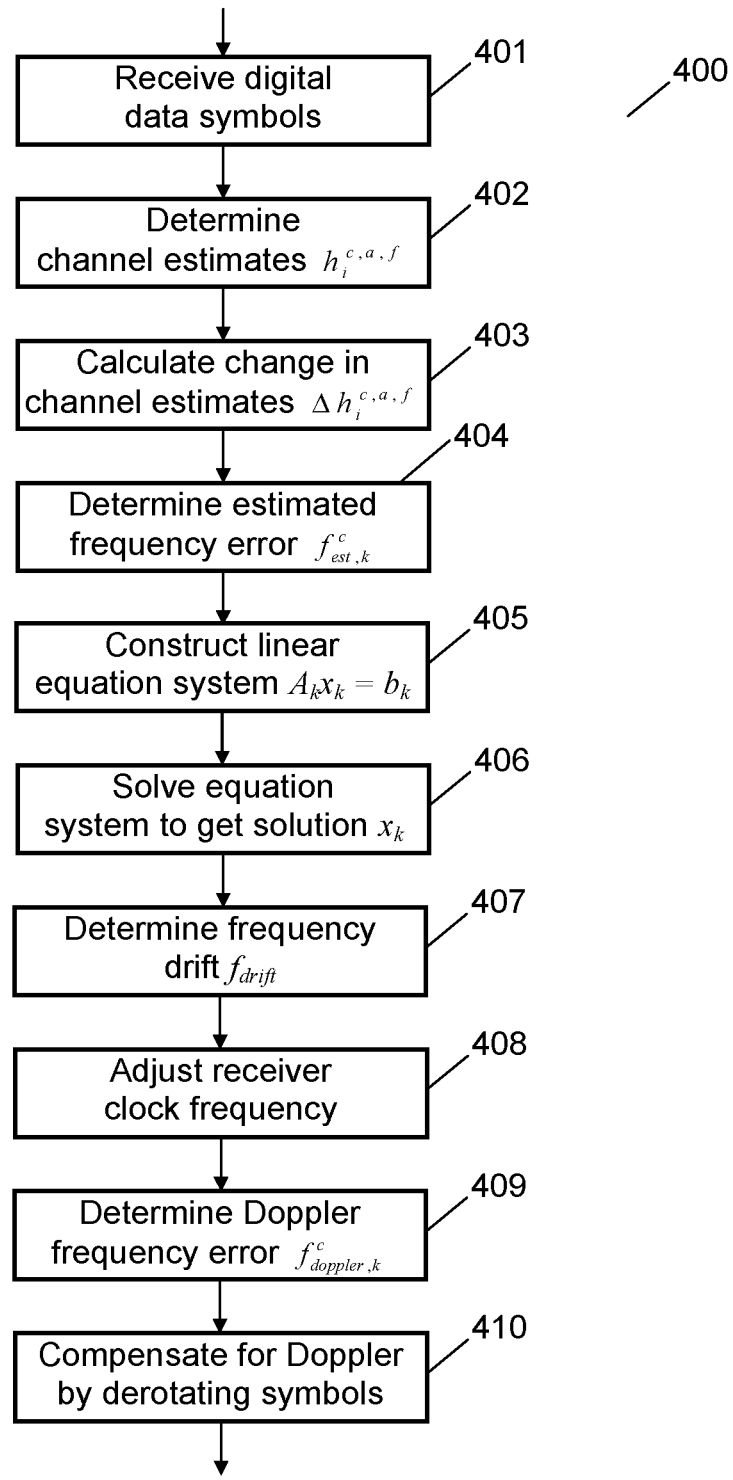
FIG. 6 shows a flowchart of a method of determining frequency drift and frequency error caused by Doppler effect.

FIG. 6 shows a flowchart 400 of the method described above. In step 401 digital data symbols including pilot symbols are received in the receiver. From the received pilot symbols channel estimates $h_i^{c,a,f}$ are determined in step 402, e.g. in a channel estimator 14 as shown in FIG. 5, and in step 403 a change between consecutive channel estimates is calculated. The values obtained in step 403 are then used in step 404 for determining a frequency error estimate $f_{est,f}^c$ as described above. This estimate represents the total frequency error comprising frequency drift due to clock mismatch as well as frequency error due to Doppler effect.

In step 405 a linear equation system $A_k x_k = b_k$ describing the relation between the measured frequency error estimates $f_{est,f}^c$ and their drift and Doppler components is constructed, and in step 406 this equation system is solved by solving a linear least square problem, e.g. by Gaussian elimination. From the resulting solution $x_k$ the corresponding values of the two components, i.e. the frequency drift $f_{drift}$ and frequency error $f_{doppler,f}^c$ caused by Doppler effect, can be determined in steps 407 and 409. The frequency drift can then be used in step 408 for adjusting the clock frequency of the PLL in block 300 of FIG. 1.

Figure 7:
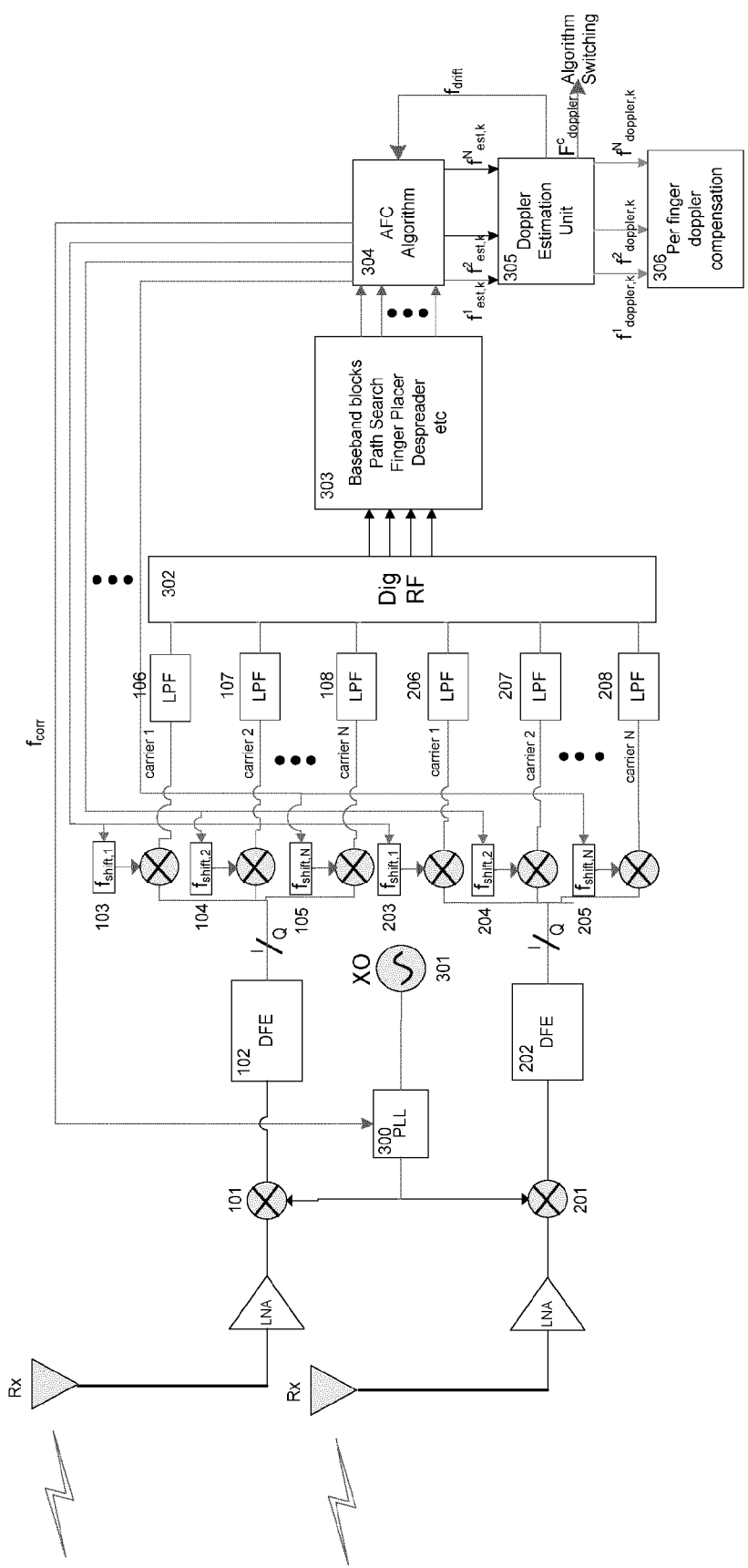
FIG. 7 shows the receiver of FIG. 1 modified by the addition of Doppler frequency estimation and Doppler compensation.

FIG. 7 shows the receiver of FIG. 1 modified by the addition of two extra blocks, i.e. the Doppler frequency estimation unit 305, in which the drift and Doppler components of the frequency error estimates are determined as described above, and the per finger Doppler compensation unit 306, which will be described below.

The improved estimate $f_{drift}$ calculated in Block 305 in FIG. 7 is fed back to the AFC block 304, where it can then be used as a feedback signal for the PLL in block 300 instead of previously estimated $f_{est}$ as mentioned above.

In addition to the benefits achieved by cancelling the effect of the Doppler in the feedback signal to the PLL described above the receiver can be further improved by utilizing the determined speed $v_k$ or the corresponding values of the Doppler component of the frequency error, as it will be described below.

The estimated velocity per finger ($v_k$) can be filtered over a number of consecutive values if the finger position remains fixed. The filtered value $v_k^{filt,n}$ for n=1, 2, ... can be computed as follows $$v_k^{filt,1} = \beta, \quad (10)$$

$$v_k^{filt,2} = \lambda(v_k^1 - v_k^{filt,1}) + v_k^{filt,1},$$

$$\ldots$$

$$v_k^{filt,n} = \lambda(v_k^i - v_k^{filt,n-1}) + v_k^{filt,n-1}, \text{ for } i = 2, 3 \ldots,$$

where β is the initial value of the filter, λ is the filtering constant and $v_k^i$ is the ith value computed in (8).

The speed estimate per finger and carrier can be used to compensate for Doppler effect per finger and carrier. The example below describes how this could be done for the HS-PDSCH. Let $s_t^{c,a,k}$ denote the de-spreaded symbol for the HS-PDSCH for carrier number c, antenna number a and finger number k.

Assume that $v_k$ has been filtered according to (10), then compute the corresponding frequency shift (step 409 of FIG. 6)

$$f_{doppler,k}^c = -\frac{v_k}{\lambda_0 + \Delta\lambda_c} \quad (11)$$

This Doppler frequency estimate calculated in block 305 is fed into block 306 in FIG. 7, and the despreaded data symbols for each finger and carrier may then be compensated for the effect of the Doppler by de-rotating them with the corresponding Doppler frequency error. This compensation may be performed e.g. between the RAKE unit 13 and the combiner 17 in FIG. 5, and it is shown in step 410 of FIG. 6. The de-rotated symbol is derived as follows $$s_t'^{c,a,k} = e^{-(2\pi j)f_{doppler,k}^c \cdot t}(s_t^{c,a,k}), \quad (12)$$

where t is the time between subsequent data symbols, i.e. between $s_{t-1}^{c,a,f}$ and $s_t^{c,a,f}$. The de-rotatation of the symbols will lead to increased performance since less noise is introduced in the combined symbols.

As the algorithm proposes per finger Doppler compensation for the peak fingers this will lead to appreciable gains especially for high Doppler scenarios compared to present solutions. By de-rotating the peak fingers the phase rotation caused by the Doppler effect can be compensated on these fingers. This will also improve the equalizer performance, leading in turn to higher throughput.

Further, a weighted average of the Doppler frequency estimate per finger can be used for switching algorithms.

$$F_{doppler}^c = \frac{1}{M}\sum_{k=1}^{M} w_k f_{doppler,k}^c \quad (13)$$

where $w_k$ is the weight for finger k. The value $F_{doppler}^c$ can be filtered if desired. Since this method provides more precise Doppler frequency estimates it will improve the mode selection and thus increase the overall system performance.

Although various embodiments of the present invention have been described and shown, the invention is not restricted thereto, but may also be embodied in other ways within the scope of the subject-matter defined in the following claims.

The invention claimed is:

1. A method of receiving digital data symbols sent from a transmitter on at least two carrier frequencies generated from a common clock signal, wherein individual multipath components of a transmitted data symbol are received with individual delays, and wherein received signals are processed by a receiver unit having at least two fingers, the method comprising:
   determining from successively received symbols successive channel estimates for each finger and each carrier;
   calculating for each finger and each carrier from a set of successive channel estimates a change in channel estimate;
   determining from said change in channel estimate an estimated frequency error for each finger and each carrier;
   constructing a linear equation system corresponding to the at least two carriers and at least two fingers, in which each estimated frequency error is expressed as a function of a first variable indicative of a frequency drift caused by a clock mismatch between the receiver and the transmitter and a second variable indicative of a frequency error caused by a Doppler effect due to movement of the receiver relative to the transmitter;
   solving said equation system to obtain estimates of said first and second variables;
   determining an estimate of the frequency drift from the estimates of the first variable; and
   utilizing said estimate of the frequency drift as a feedback signal for adjusting the receiver clock frequency.

2. The method according to claim 1, wherein the step of solving the equation system comprises using Gaussian elimination.

3. The method according to claim 1, wherein the step of solving the equation system comprises solving a linear least square problem.

4. The method according to claim 1, wherein each first variable is a frequency drift for a corresponding one of the fingers.

5. The method according to claim 4, wherein determining the estimate of the frequency drift comprises averaging the first variable over all fingers.

6. The method according to claim 1, wherein each second variable is a velocity of the receiver relative to the transmitter for a corresponding one of the fingers.

7. The method according to claim 1, wherein the method further comprises the steps of:
   determining an estimate of the frequency error caused by the Doppler effect for each finger and each carrier, from the estimates of the second variable obtained for each finger and each carrier; and
   utilizing said estimate of the frequency error caused by the Doppler effect for each finger and each carrier for compensating signals received for each finger and each carrier for the frequency error caused by said Doppler effect.

8. A receiver configured to receive digital data symbols sent from a transmitter on at least two carrier frequencies generated from a common clock signal, wherein individual multipath components of a transmitted data symbol are received with individual delays, and wherein received signals are processed by a receiver unit having at least two fingers, the receiver being configured to:
   determine from successively received symbols successive channel estimates for each finger and each carrier;
   calculate for each finger and each carrier from a set of successive channel estimates a change in channel estimate; and
   determine from said change in channel estimate an estimated frequency error for each finger and each carrier;
   construct a linear equation system corresponding to the at least two carriers and the at least two fingers, in which each estimated frequency error is expressed as a function of a first variable indicative of a frequency drift caused by a clock mismatch between the receiver and the transmitter and a second variable indicative of a frequency error caused by a Doppler effect due to movement of the receiver relative to the transmitter;
   solve said equation system to obtain estimates of said first and second variables;

determine an estimate of the frequency drift from the estimates of the first variable; and utilize said estimate of the frequency drift as a feedback signal for adjusting the receiver clock frequency.

9. The receiver according to claim 8, wherein the receiver is configured to solve the equation system using Gaussian elimination.

10. The receiver according to claim 8, wherein the receiver is configured to solve the equation system by solving a linear least square problem.

11. The receiver according to claim 8, wherein each first variable is a frequency drift for a corresponding one of the fingers.

12. The receiver according to claim 11, wherein the receiver is configured to determine the estimate of the frequency drift by averaging the first variable over all fingers.

13. The receiver according to claim 8, wherein each second variable is a velocity of the receiver relative to the transmitter for a corresponding one of the fingers.

14. The receiver according to claim 8, wherein the receiver is further configured to:

determine an estimate of the frequency error caused by the Doppler effect for each finger and each carrier, from the estimates of the second variable obtained for each finger and each carrier; and utilize said estimate of the frequency error caused by the Doppler effect for each finger and each carrier for compensating signals received for each finger and each carrier for the frequency error caused by said Doppler effect.

15. A non-transitory computer readable medium storing a computer program comprising program instructions that, when executed by a processor in a receiver having at least two fingers, configure the receiver to receive digital data symbols sent from a transmitter on at least two carrier frequencies generated from a common clock signal, wherein individual multipath components of a transmitted data symbol are received with individual delays, and process the received signals, said computer program instructions comprising instructions configuring the receiver to:

determine from successively received symbols successive channel estimates for each finger and each carrier;

calculate for each finger and each carrier from a set of successive channel estimates a change in channel estimate;

determine from said change in channel estimate an estimated frequency error for each finger and each carrier;

construct a linear equation system corresponding to the at least two carriers and the at least two fingers, in which each estimated frequency error is expressed as a function of a first variable indicative of a frequency drift caused by a clock mismatch between the receiver and the transmitter and a second variable indicative of a frequency error caused by a Doppler effect due to movement of the receiver relative to the transmitter;

solving said equation system to obtain estimates of said first and second variables;

determining an estimate of the frequency drift from the estimates of the first variable; and utilizing said estimate of the frequency drift as a feedback signal for adjusting the receiver clock frequency.

\* \* \* \* \*